United States Patent
Curran et al.

[11] Patent Number: 5,942,175
[45] Date of Patent: *Aug. 24, 1999

[54] FIBER CLUSTERS MOLDING PROCESS AND EQUIPMENT

[75] Inventors: Thomas A. Curran, Wilmington; William G. Johanson, Hockessin; Nathan W. Ladley, New Castle, all of Del.; O'Dell Scarborough, Sicklerville, N.J.

[73] Assignee: E. I. du Pont de Nemours and Company, Wilmington, Del.

[*] Notice: This patent is subject to a terminal disclaimer.

[21] Appl. No.: 08/706,629

[22] Filed: Sep. 6, 1996

Related U.S. Application Data

[60] Continuation of application No. 08/495,875, Jun. 28, 1995, abandoned, which is a division of application No. 08/274,501, Jul. 13, 1994, Pat. No. 5,454,992.

[51] Int. Cl.⁶ .......................... B29C 35/04; B32B 31/00
[52] U.S. Cl. ............................... 264/112; 264/122
[58] Field of Search ...................... 264/112, 122

[56] References Cited

U.S. PATENT DOCUMENTS

| | | | |
|---|---|---|---|
| 4,794,038 | 12/1988 | Marcus | 428/288 |
| 4,940,502 | 7/1990 | Marcus | 156/272.2 |
| 5,169,580 | 12/1992 | Marcus | 264/115 |
| 5,194,311 | 3/1993 | Baymak et al. | 428/116 |
| 5,238,612 | 8/1993 | Halm et al. | 264/15 |
| 5,294,392 | 3/1994 | Marcus | 264/118 |
| 5,366,678 | 11/1994 | Nomizo et al. | 264/122 |
| 5,378,296 | 1/1995 | Vesa | 156/62.6 |
| 5,500,295 | 3/1996 | Halm et al. | 428/357 |

FOREIGN PATENT DOCUMENTS

| | | |
|---|---|---|
| 0 276 682 A3 | 8/1988 | European Pat. Off. . |
| 0276682 | 8/1988 | European Pat. Off. . |
| 538372 | 1/1992 | European Pat. Off. . |
| 3-170112 | 7/1991 | Japan . |
| 3170112 | 7/1991 | Japan . |
| 5-220278 | 8/1993 | Japan . |
| 5220278 | 8/1993 | Japan . |
| 124967 | 5/1995 | Japan . |
| 7-124967 | 5/1995 | Japan . |
| 815630 | 11/1955 | United Kingdom . |
| 815630 | 7/1959 | United Kingdom . |
| WO86/06114 | 10/1986 | WIPO . |
| WO 92/01104 | 1/1992 | WIPO . |
| WO92/01104 | 1/1992 | WIPO . |

*Primary Examiner*—Mary Lynn Theisen
*Attorney, Agent, or Firm*—Hilmar L. Fricke

[57] ABSTRACT

A process and apparatus for molding recyclable cushions is disclosed. The cushions are molded by a process comprising filling a mold with polyester fiber clusters, encapsulating the fibers clusters with a scrim sheet or adhesive, closing the mold, advancing the mold to a heating station where hot air is forced through the mold, advancing the mold to a cooling station where cool air is forced through the mold, and subsequently releasing the molded part from the mold.

15 Claims, 9 Drawing Sheets

FIBER CLUSTERS MOLDING PROCESS AND EQUIPMENT

This is a continuation, of application Ser. No. 08/495,875 filed Jun. 28, 1995, now abandoned, which is a division of application Ser. No. 08/274,501, filed Jul. 13, 1994, now U.S. Pat. No. 5,454,992.

FIELD OF THE INVENTION

This invention concerns cushions or seating for furniture pieces, such as armchairs, chairs, car seats and the like, and more particularly to a process and apparatus providing molded bonded polyester fiber articles from fiber clusters of the polyester fiber blended with binder fibers.

BACKGROUND OF THE INVENTION

Automotive manufacturers face a need for lighter cars as governmental forces are seeking higher mileage per gallon standards for new cars. Manufacturers are also interested in having materials which can be reused or recycled to be used as components within the car.

Thermally-bonded polyester fiber structures are well known for use in furnishings such as mattresses, chairs and car seats where high support and durability are required. For example, see U.S. Pat. Nos. 4,668,562 and 4,753,693. One advantage of using such polyester fiber structures is that they can be depolymerized into basic monomers by known methods, such as methanolysis, for reuse. Polyester fibers can also be directly recycled as raw materials for new parts.

A typical five passenger vehicle contains twenty pounds of polyurethane foam for seating while molded seats using the present invention weigh 14 pounds, a savings of thirty percent for equivalent performance.

Heretofore, batch processes have been used to mold cushions for use as a car seat. In automotive applications, however, production runs are continuous and extended. Processes have to be cost effective and involve a minimum amount of labor and time per part. Prior inventions have focused on methods to fill a mold effectively. There has been no method, however, which will completely automate the process of manufacture of recyclable seat cushions for automobiles in a cost effective and time efficient manner.

SUMMARY OF THE INVENTION

A process and apparatus have been invented for molding recyclable cushions from fiber clusters comprised of polyester fibers with thermally-bondable binder fibers. The process of forming such cushions involves the steps of placing a lower mold form onto a table attached to a rotatable arm, placing within the lower mold form a scrim sheet, loading such polyester fibers on top of the scrim sheet, placing a second scrim sheet over the fiber ball assembly, placing an upper mold form onto the lower mold form, rotating the mold on the table using the rotatable arm to a heating station where heated air is forced through the mold to activate the binder fibers within the cluster assembly, and rotating the mold on the table using the rotatable arm to a cooling station, and removing the molded article when cooled.

In an alternative embodiment of the invention, an adhesive may be substituted for the scrim sheet to encapsulate the fiber clusters prior to closing of the mold and heating of the fibers. The fibers are sprayed prior to the closing of the mold. Sprayed fibers may also be used as an encapsulation agent in lieu of a scrim sheet or a scrim bag.

In another alternative, the fiber clusters may be encapsulated within individual scrim bags prior to being loaded in the mold. Adhesive is placed on the individual bags prior to closing the mold to ensure good contact of the materials in molding.

In another alternative, the molded fiber cluster pad may be encapsulated within a heat shrinkable polyester "bag" subsequent to cushion molding. In this case the bag, upon heating outside a mold, would conform to the shape of the pad and provide the benefits of durability and appearance.

The foregoing summary of the invention will be more clearly understood in light of the detailed description which follows.

DETAILED DESCRIPTION OF THE INVENTION

Fiber clusters are polyester fibers that are randomly arranged and entangled to form a three-dimensional nominally spherical shape, preferably with a minimum of hair extending from the surface, so as to be air-transportable. Such a shape contributes to load support and compression resistance in the molded part.

Figure 1:
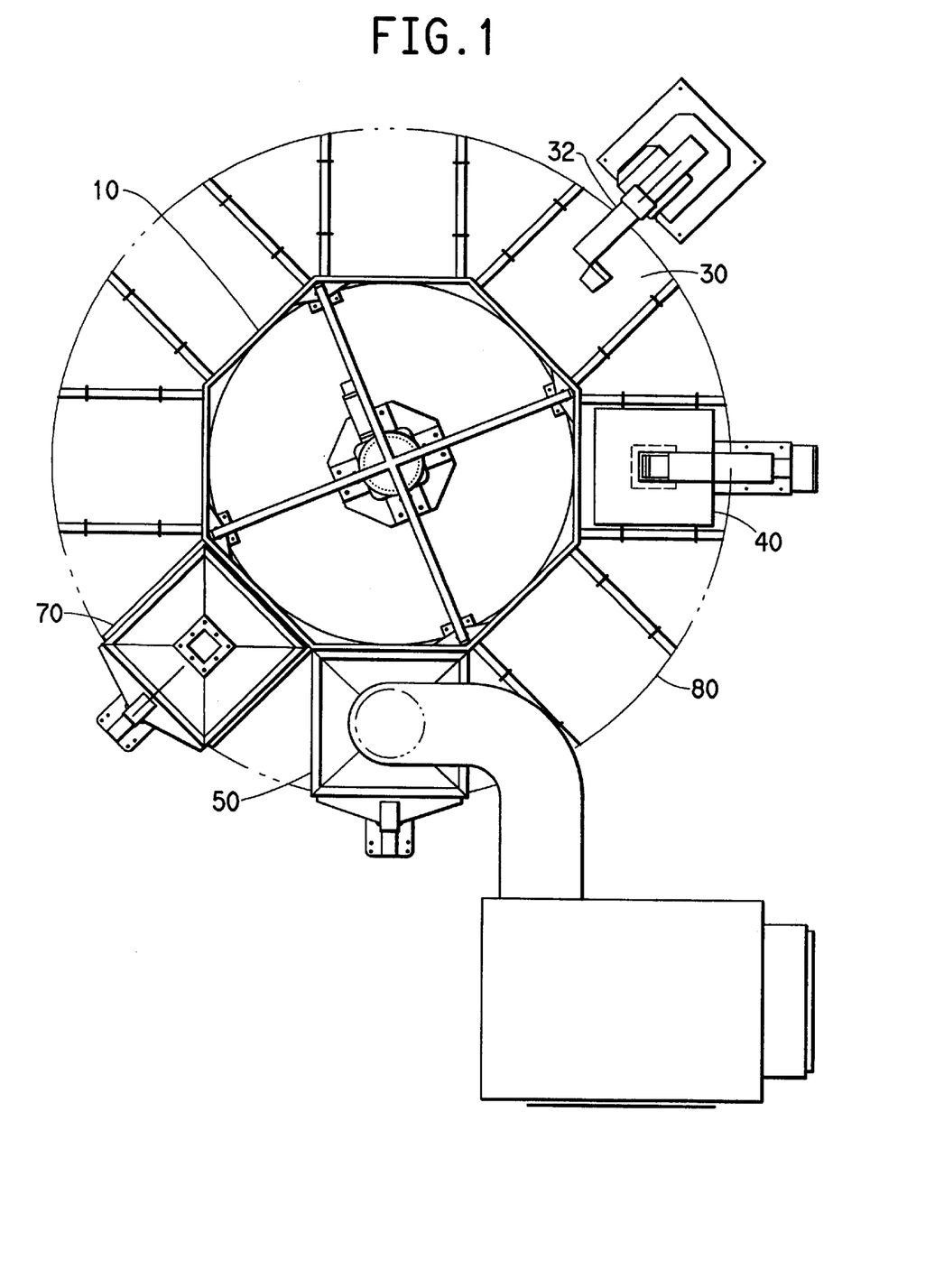
FIG. 1 is a top plan view of the rotary table and the operating stations.

A process according to the present invention is provided which uses rotary table 10 to convey a mold filled with polyester fiber clusters along a series of operating stations to provide a continuous process as illustrated in FIG. 1. Arm 9, FIG. 4, attached to table 10, FIG. 1, carries the lower portion of mold 12, FIG. 2, as it is conveyed to each subsequent station. A rotary table has an advantage of minimizing the space required for the process. Alternatively, the process could be accomplished in a linear fashion with the operating stations located in a series. Yet another alternative is to hold a mold stationary and bring the operating stations to the mold.

Figure 2:
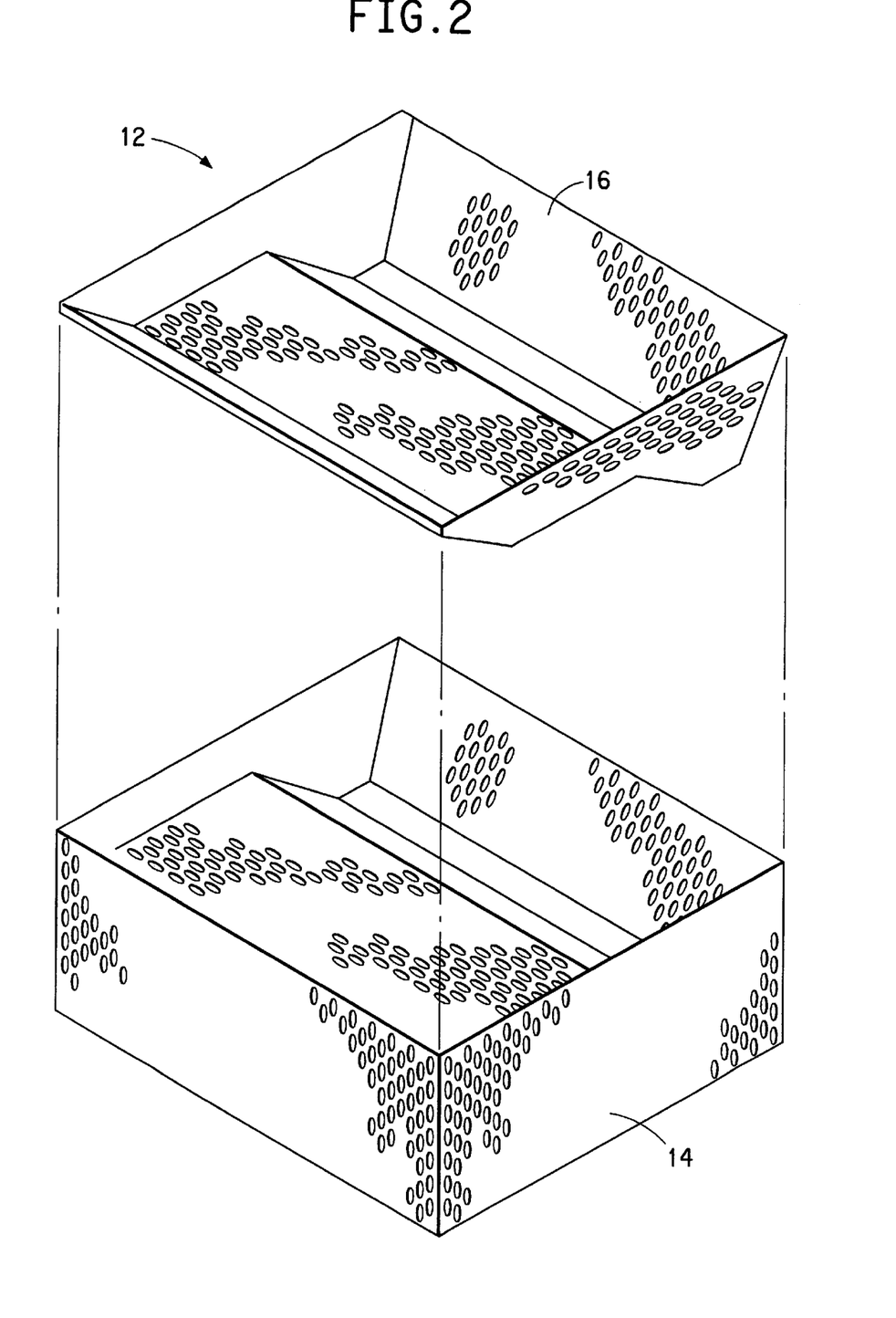
FIG. 2 is a view of the base and lid of a porous mold having a non-regular shape.

Mold 12 is fabricated from perforated metal as shown in FIG. 2. Any material which can withstand the molding pressures inherent in the molding process, typically 1–2 pounds per square inch, can be used. For example, molds can be fabricated from aluminum, carbon steel or stainless steel. Air flow through the mold is controlled by the open area of the perforated metal sheet. Alternatively, materials having a porous structure can also be used, e.g., DUOCEL® aluminum foam or reticulated vitreous carbon, both available from Energy Research and Generation, Inc., Oakland, Calif. Molds can also be fabricated using fixed or removable porous inserts. Mold 12 is fabricated in two or more parts, with base 14 and lid 16 designed as required to provide the final desired shape of the cushion molded. Separate parts of the mold can be hinged for easier closing and opening of the molds.

An example of fiber clusters which can be used, with their preparation and bonding, is disclosed in U.S. Pat. No. 4,794,038. Clusters are typically transported in densely packed containers. Consequently, the fiber clusters must be "opened" before molding, that is reduced in density to 1–2 pounds per cubic foot. Such dedensification can be accomplished by manually unloading and opening the clusters and placing the clusters within the mold.

Typical devices such as mechanical pin type belts and rollers to open fiber clusters have a tendency to damage the clusters. Instead, a centrifugal blower device can be used to open the clusters prior to placement in the mold to avoid operator fatigue and increase time savings. A blower feeds clusters into the mold after pulling them out of a shipping container through a fill tube. Alternatively, the clusters can be opened using vortex accumulator 22, FIG. 3. The clusters are brought from supply source 21 through blower 23 which reduces their density and propels them from outlet duct 24 into inlet 25 of vortex accumulator 22. A vortex air flow tumbles the clusters in the accumulator. A volume of clusters may be held in the accumulator and discharged at any time through the discharge port of the accumulator to fill the mold. The air stream which carries the clusters within the vortex accumulator circulates and then is vented to the outside though a vent designed to prevent discharge of the clusters. To discharge the clusters, the vent valve is closed and the discharge valve is opened to allow the air stream to carry the clusters out through discharge port 26 to the fill station in an uniform flow.

Figure 3:
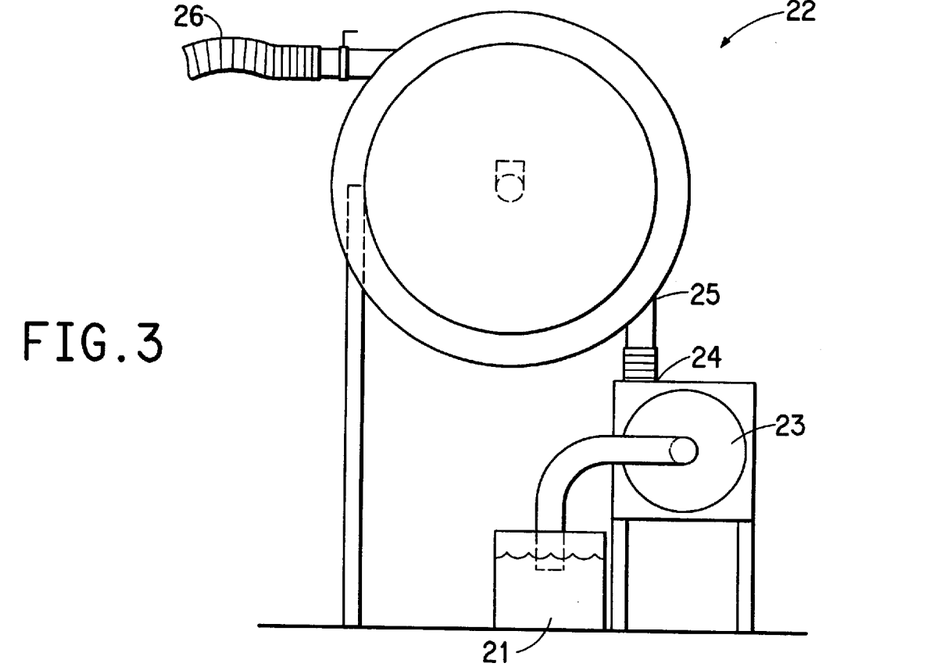
FIG. 3 is a view of a vortex accumulator.

Vortex accumulator 22 can be positioned in either a vertical or horizontal orientation. A horizontal position is preferred since clusters can tend to become trapped by gravity in the lowest point of a vertically-oriented accumulator.

It is desirable to protect a fiber cushion with an outer wrapping of fabric, a scrim. This provides durability in handling the cushion prior to assembly within the final cover. The scrim provides integrity to minimize peeling of individual cluster flaking. A lightweight polyester spun bonded sheet, such as DuPont SONTARA®, can be used, with a fine layer of polyester adhesive applied to the side contacting the clusters to adhere the scrim sheet to the clusters. The material can be precut and/or pre-sewn before its placement into the mold. Clusters are then placed on top of this scrim sheet. A second scrim sheet can optionally be placed over the clusters prior to the molding operation to provide complete encapsulation of the clusters.

Alternatively, a spray polyester adhesive can be used instead of the scrim sheeting. Such an adhesive would be sprayed onto the molded article after removal from mold 12. The adhesive would harden and toughen the outside layer of clusters of the cushion. Sprayed fibers within an adhesive spray may also be used as an encapsulation agent in lieu of a scrim sheet or a scrim bag.

Within the automotive industry, it is desirable to have variable firmness within the seat cushion. The sides, or bolsters of the seat have to be durable enough to withstand the abuse of entry and exit. Extra side firmness is also desirable during cornering when lateral acceleration during driving causes the occupant to be pushed against the outside of the cushion. On the other hand, a lower density is desired in the middle of the cushion to provide comfortable support for the occupant. To achieve such variable density within the cushion, the amount of clusters deposited within each section of the mold is varied.

At the first station, filling station 30, FIG. 1, clusters are introduced into mold 12, FIG. 2. Placement of the fiber clusters within mold 12 can be accomplished by several means. As noted above, clusters can be manually unloaded from a storage container and placed within the mold. Preferably, clusters are introduced into the mold automatically. To fill the mold with variable volumes of clusters, a programmable positioning device, such as a programmable robot 32, FIG. 1, or powered x-y-z positioning device, not shown, is used to manipulate a mold fill hose through which clusters are conveyed in an air stream. The air hose is manipulated so that it is positioned over various zones of the mold for specific periods of time. Time in position would be dependent upon the amount of firmness desired in that particular zone of the cushion. Using a programmable robot or powered positioning device would enable use of several cushion profiles having unique density requirements. In addition, this would enable great savings in labor as well as creating consistency for a particular seat profile.

Figure 4:
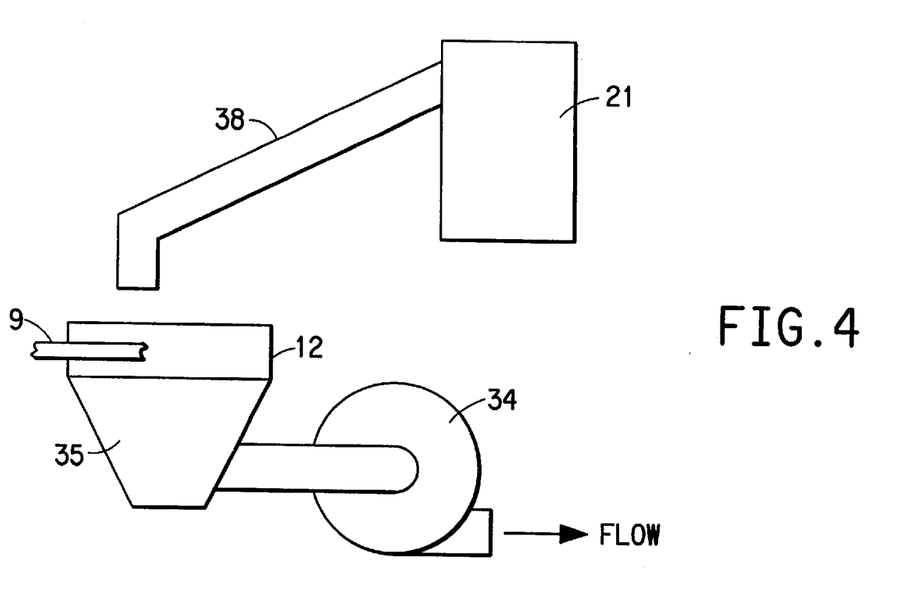
FIG. 4 is a side view of the filling means.
Figure 5A:
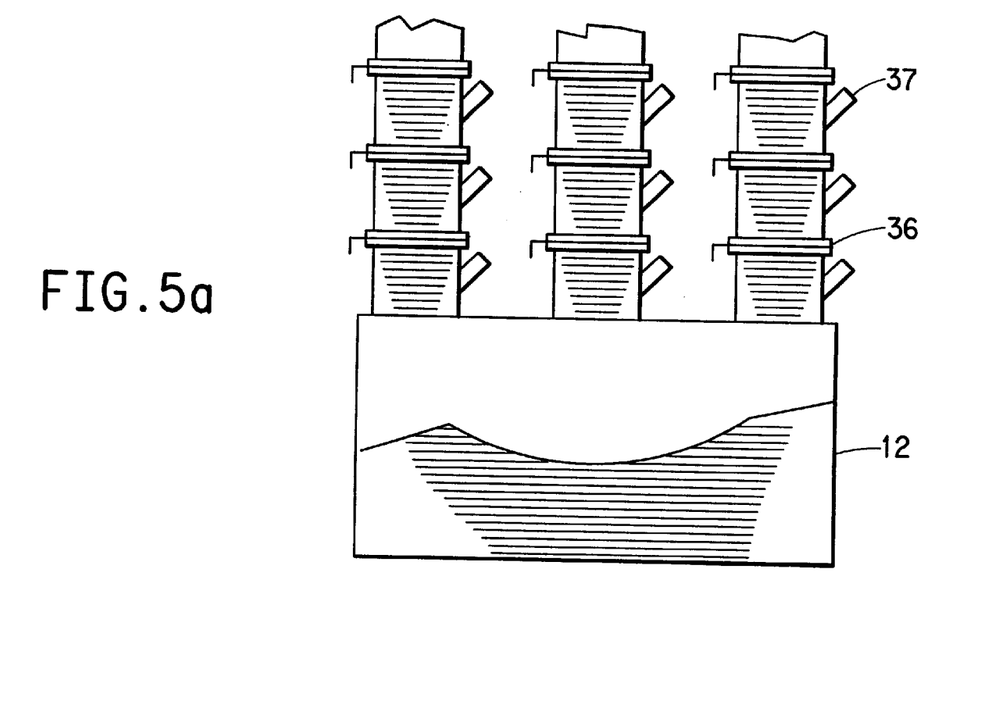
FIG. 5a and FIG. 5b are views of stationary hoses to load the mold.
Figure 5B:
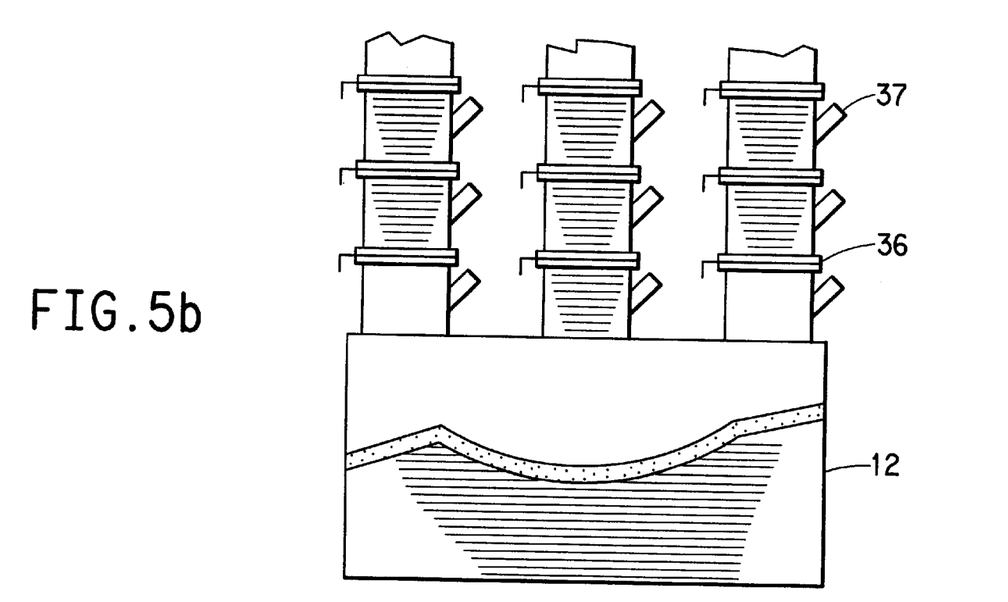

Conveying loose clusters to mold 12 via an airstream creates a turbulent air flow at the discharge outlet of fill hose 38, FIG. 4, which disturbs the desired placement of clusters. To confine the clusters to the mold as they are received into the mold, a vacuum is pulled on the underside of mold 12 by blower 34 of FIG. 4 through vacuum duct 35. Alternatively, the mold can be filled using stationary hoses positioned over the mold to feed specific zones, FIG. 5a and FIG. 5b. Fiber clusters are fed into each hose and are released into mold 12 by manipulation of gate 36 on each hose. Air tubes 37 allow a stream of air to be used to drive the clusters out of the hose or into the next gated section. Each hose will have its individual weighing and conveying apparatus attached or could be used in series in conjunction with one overall feeder system.

Yet another alternative for variable filling of the mold is to utilize vertical pins which protrude through the bottom surface of the perforated mold to different heights in the mold cavity. This dense pack of pin heights will program a surface which allows clusters to fall in and around that surface. The greater the amount of pins within an area, the lesser the volume of clusters required to fill that zone. After the clusters have been placed in the mold, the pin device is retracted from the perforated mold and the clusters are allowed to settle prior to the molding process.

Figure 6A:
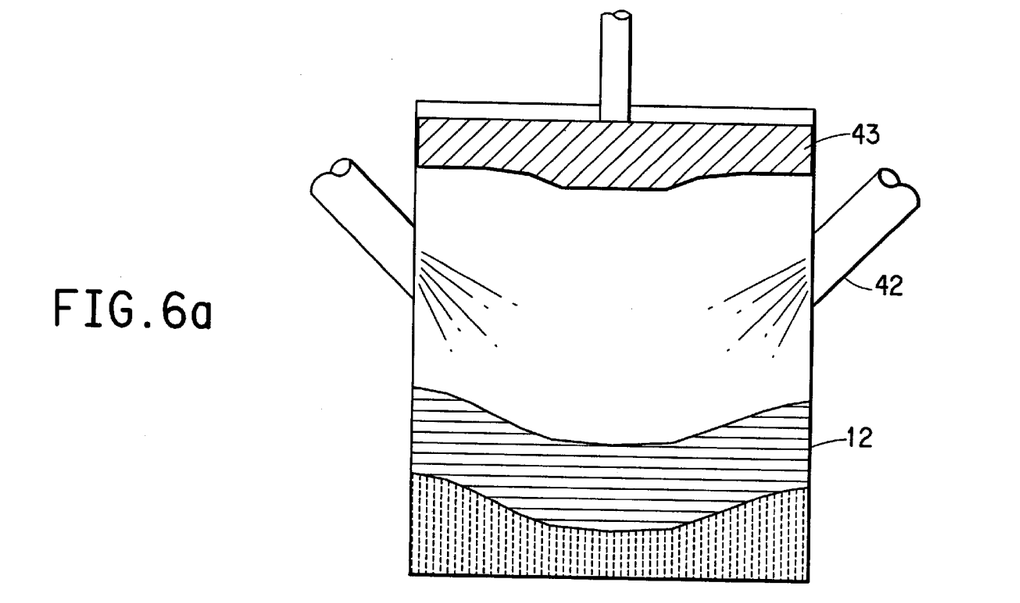
FIG. 6a and FIG. 6b are side views of directed inlets with an associated ram to load the mold.
Figure 6B:
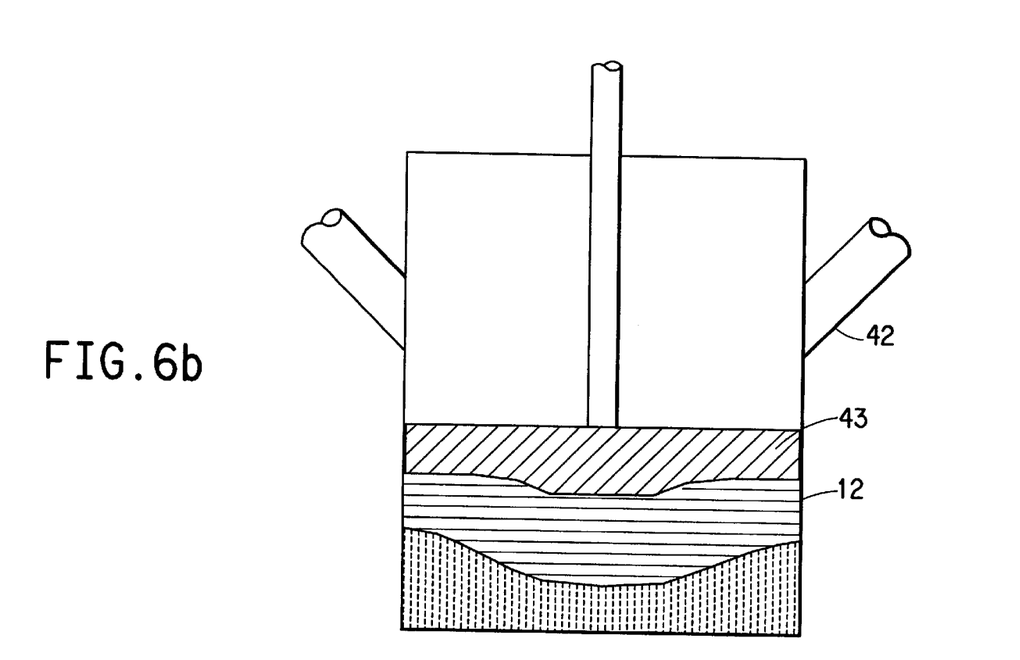

Another alternative is to use a closed mold filling process having multiple cluster flow inlets which direct the clusters to a zone within the mold, as shown in FIG. 6a and FIG. 6b. Clusters are conveyed to inlets of the flow inlet 42 by an air stream or other method. Using an air stream, different flow rates of clusters can be used to give different fill densities within the mold. Ram 43 is lowered onto the clusters after loading to compress the clusters within mold 12 to a final geometry prior to heating. Using a closed mold filling process eliminates the disturbance effects of turbulent air flow associated with using an air stream to convey the clusters to the mold.

Figure 7A:
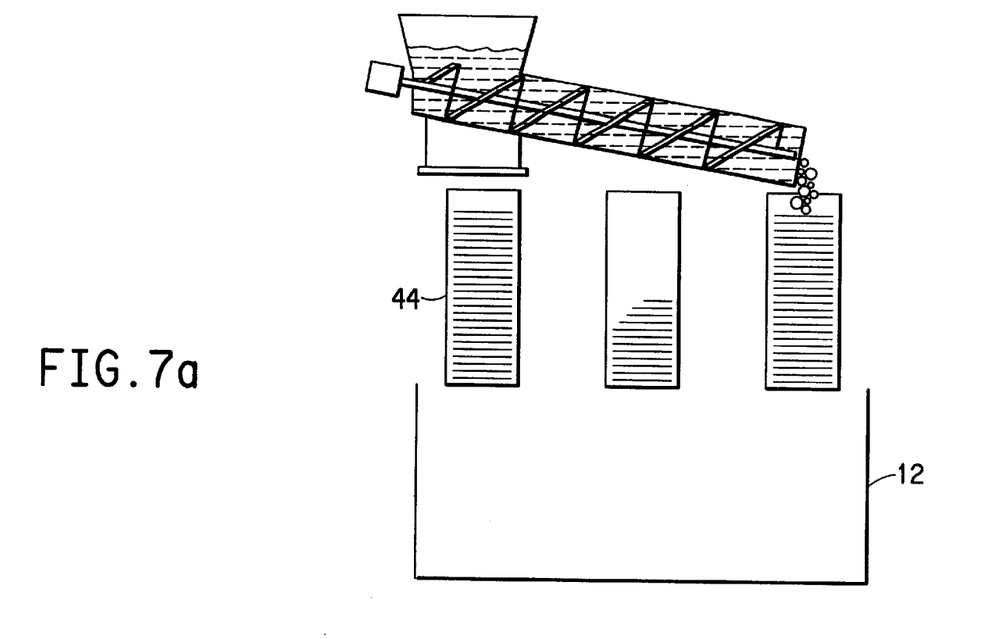
FIG. 7a and FIG. 7b are views of a loss-in-weight device and an associated ram to load the mold.
Figure 7B:
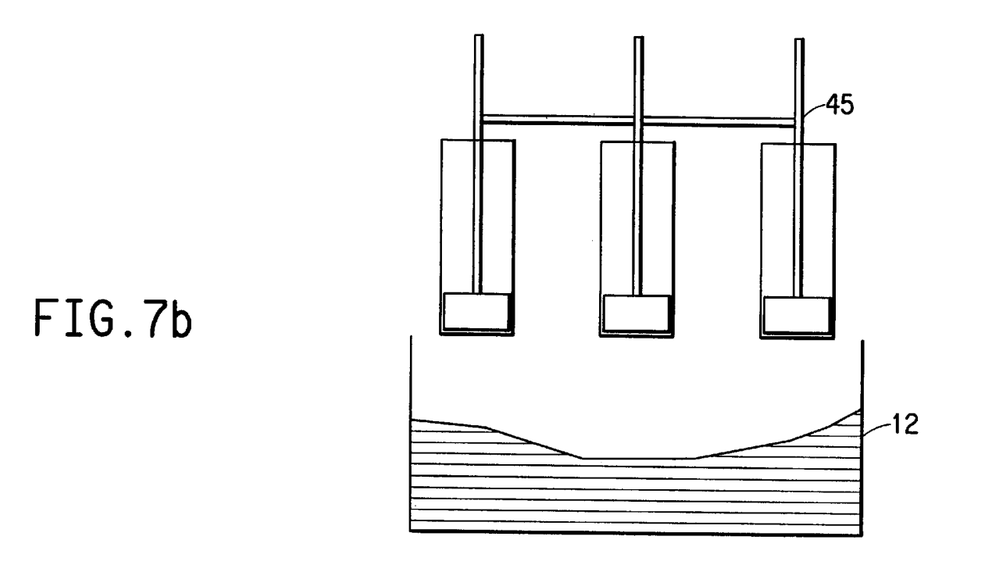

Still another alternative is a loss-in-weight material feeder, FIG. 7a and FIG. 7b, would dispense clusters to individual fill tubes 44 connected to mold 12 in amounts required by the final desired firmness of that particular zone. After tube 44 is filled, ram 45 pushes the clusters out of fill tube 44 and packs the clusters into mold 12. Such a device eliminates the turbulent air flow associated with using an air stream to convey the clusters to the mold.

Another alternative is to use pre-sewn individual bags of pre-weighed clusters which are placed within the mold. Since each bag can be filled with varying amounts of clusters, different densities can be used to achieve desired firmness in various locations within the cushion. An adhesive layer must be present on the external surface of the bag as well as the internal side to ensure that the bags will adhere to each other and create a unified cushion out of the individual bags.

Figure 8:
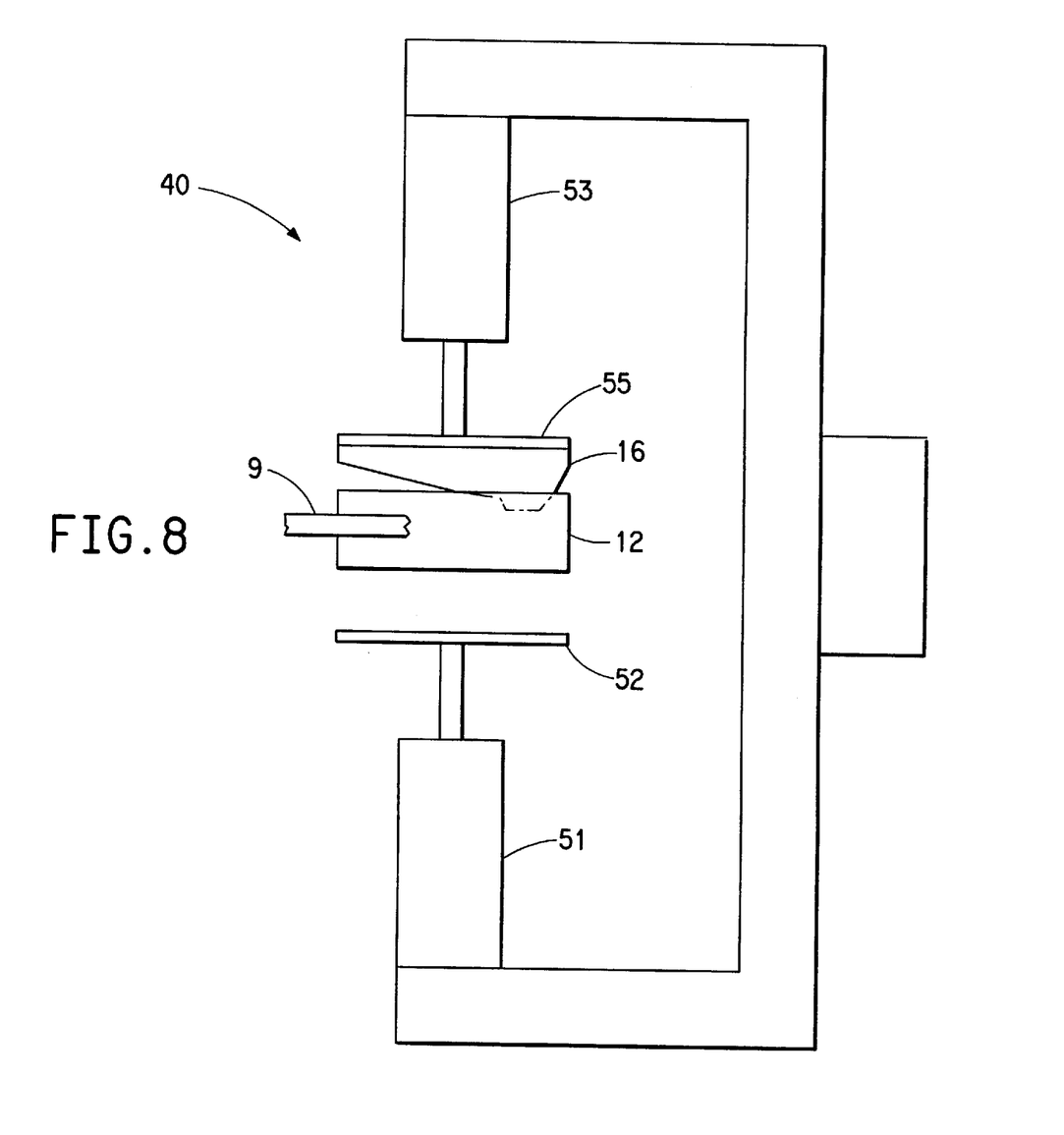
FIG. 8 is a side view of the lid installation station.

After mold 12 has been charged with the clusters, mold 12 is rotated to lid installation station 40, as shown in FIGS. 1 and 8. Optionally, a second scrim sheet is placed over the cluster assembly prior to the closing of mold 12. Hydraulic cylinder 51, FIG. 8, with large supporting plate 52 activates under mold 12 to support mold base 14, FIG. 2 and reduce pressure on the rotating table assembly. Mold lid 16 is placed on top of mold base 14. Hydraulic cylinder 53 with large distribution plate 55 activates above mold 12 and applies sufficient pressure to close and latch mold 12. Top and bottom hydraulic cylinders 51 and 53 retract their respective supporting plates 52 and 55 and mold 12 is rotated into heating station 50 as illustrated in FIG. 1.

Figure 9:
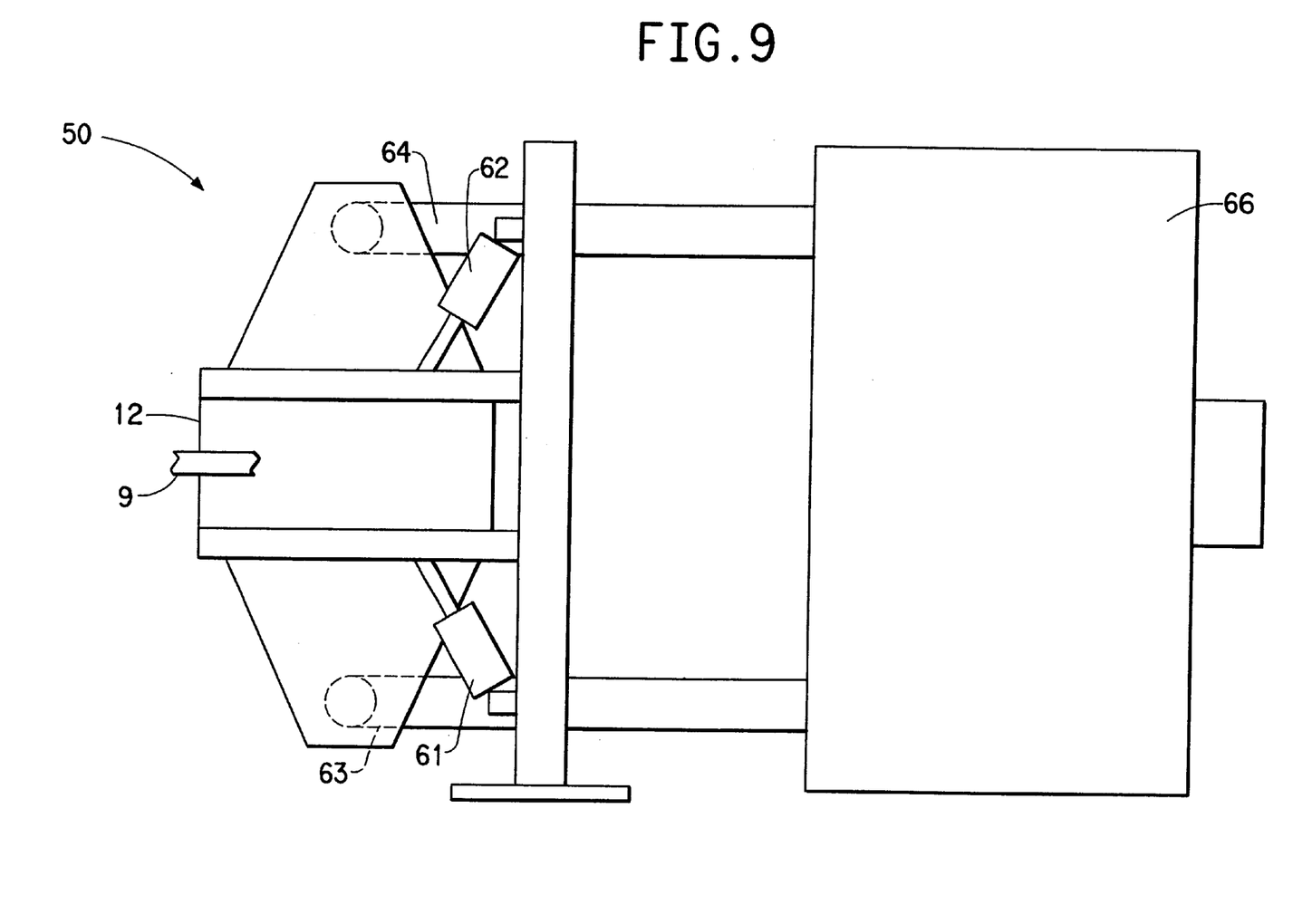
FIG. 9 is a side view of the heating station.

At heating station 50, FIG. 9, hydraulic cylinders 61 and 62 are activated to position air ducts 63 and 64 into contact with mold 12 to provide a route of air circulation between the mold and the heat source. Forced hot air, between 150–245 degrees C., is supplied to mold 12. The heated air activates the binder fibers within the fiber clusters which provides the adhesive to provide form to the molded part. The air is heated by use of commercial oven 66 which has been modified to include hydraulically operated ducts for directing the air flow. Preferably, hot air enters the mold cavity from the bottom and exits at the top of the mold. Alternatively, heated air can be fed through the top surface of the mold, or can be directed alternately through the top and bottom mold surfaces. To save energy, hot air can be collected, reheated back to the working temperature and reused. The heating cycle depends on many factors, including the density of the fiber clusters mass, the air temperature, and the resistance of the perforated mold surface to air flow. For economic reasons it is preferable to work with a high air flow and thus minimize the duration of the heating cycle. Air pressure on the molded surface is controlled by an electrically controlled variable speed blower. The pressure drop across the molded part is monitored using a manometer, not shown.

Figure 10:
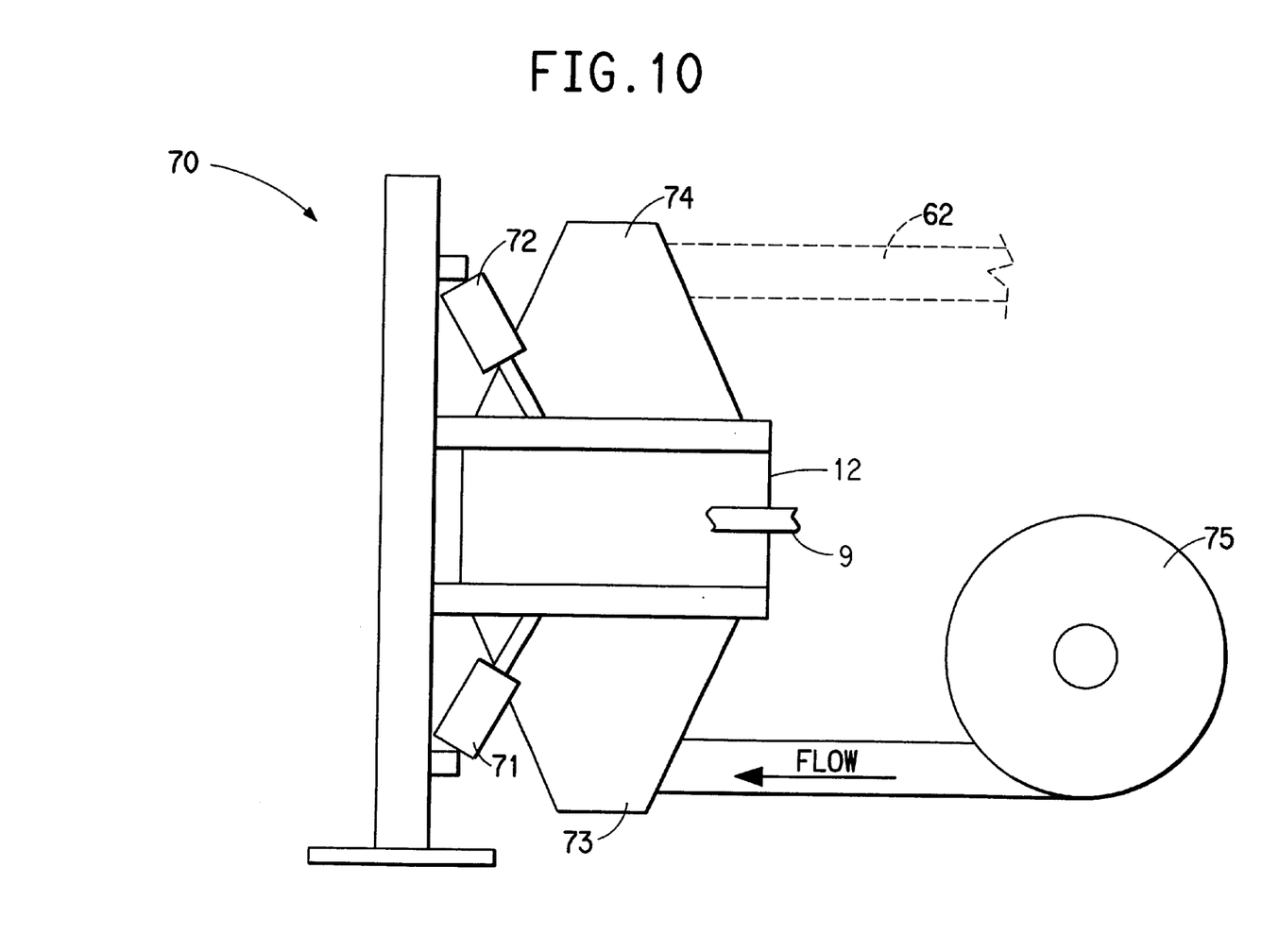
FIG. 10 is a side view of the cooling station.

After mold 12 has been heated to the required temperature and time, hydraulic cylinders 61 and 62 are activated to release their contact with mold 12. Mold 12 is rotated to cooling station 70, as shown in FIGS. 1 and 10. Hydraulic cylinders 71 and 72 are activated to position air ducts 73 and 74 into contact with mold 12 to provide a route of air circulation between the mold and the source of cooling air. Cool air is forced through mold 12 using electrically controlled variable speed blower 75 as indicated in FIG. 10. Again, the air flow can be through the bottom of mold 12, through the top of mold 12, or a combination of both directions. A substantial part of the energy can be recovered in the cooling zone and used to heat the air intake of the heating system by channeling the cooling air from mold 12 to oven 66 using air duct 62. Alternatively, this air stream can be directed to preheat station 80, FIG. 1, where the preheated air is forced into mold 12 prior to the full heating cycle. This "preheating" will lower molding time at the heating station.

After the part has been sufficiently cooled, hydraulic cylinders 71 and 72 are activated to release their contact with mold 12 and the mold is rotated away from cooling station 70. The molded part is removed from mold 12. Removal can be accomplished manually or through automated means. To facilitate the unmolding of the cushion the bottom of mold 12 should preferably have a movable base, which can be pushed upwards to free the molded piece.

Optionally, the molded part may be encapsulated within a heat shrinkable polyester "bag" after molding. The encapsulating bag, upon heating, will conform to the shape of the molded part and provide durability and improved appearance to the part.

Various modifications and alterations will be readily suggested to persons skilled in the art. It is intended, therefore, that the foregoing be considered as exemplary only.

What is claimed is:

1. An automated process for molding shaped articles from load-bearing fiber clusters, comprising:
    positioning a mold at a loading station;
    loading the fiber clusters into the mold;
    advancing the mold to a heating station;
    heating the mold by forcing hot air into the mold;
    advancing the mold to a cooling station;
    cooling the shaped article by forcing cool air into the mold;
    advancing the mold to a removal station; and
    removing the shaped article from the mold.

2. The automated process of claim 1, wherein the loading step further comprises encapsulating the fiber clusters within the mold.

3. The automated process of claim 2, wherein the encapsulation step further comprises lining a portion of the mold with a scrim sheet.

4. The automated process of claim 2, wherein the encapsulation step further comprises lining a portion of the mold with an encapsulation adhesive.

5. The automated process of claim 2, wherein the encapsulation step further comprises spraying encapsulation fibers into the mold.

6. The automated process of claim 2, wherein the encapsulation step further comprises placing the fiber clusters within individual scrim bags.

7. The automated process of claim 1, wherein the mold has a plurality of fill zones.

8. The automated process of claim 7, wherein the loading step further comprises varying the amount of fiber clusters introduced into the various fill zones of the mold such that a variable density article is produced.

9. The automated process of claim 8, wherein the loading step further comprises automatically introducing the fiber clusters into the mold using a programmable positioning device.

10. The automated process of claim 8, wherein the loading step further comprises using stationary hoses positioned over the mold to feed specific fill zones.

11. The automated process of claim 8, wherein the loading step further comprises using vertical pins which protrude through a bottom surface of the mold to different heights in the mold cavity, thereby further defining and segregating the fill zones.

12. The automated process of claim 8, wherein the loading step further comprises closing the mold and subsequently filling the mold via a plurality of fiber cluster flow inlets directed to the various fill zones within the mold.

13. The automated process of claim 8, wherein the loading step further comprises placing a plurality of individual bags of pre-weighed fiber clusters into the mold.

14. The automated process of claim 1, further comprising the step of encapsulating the shaped article.

15. An automated process for molding shaped articles from load-bearing fiber clusters, comprising:
    loading the fiber clusters into a mold;
    advancing a heating station to the mold;
    heating the mold by forcing hot air into the mold;
    advancing a cooling station to the mold;
    cooling the shaped article by forcing cool air into the mold; and
    removing the shaped article from the mold.

* * * * *